(12) United States Patent
Emekci et al.

(10) Patent No.: US 8,392,406 B1
(45) Date of Patent: Mar. 5, 2013

(54) DETERMINING A HEIGHT-BALANCED HISTOGRAM INCREMENTALLY

(75) Inventors: Fatih Emekci, San Mateo, CA (US); Sunil P. Chakkappen, Foster City, CA (US); Uri Shaft, Castro Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 706 days.

(21) Appl. No.: 12/190,885

(22) Filed: Aug. 13, 2008

Related U.S. Application Data

(60) Provisional application No. 61/057,677, filed on May 30, 2008.

(51) Int. Cl.
*G06F 7/00* (2006.01)

(52) U.S. Cl. .......... 707/719; 707/688; 707/798

(58) Field of Classification Search .......... 707/688, 707/719, 798
See application file for complete search history.

(56) References Cited

U.S. PATENT DOCUMENTS

| | | | |
|---|---|---|---|
| 4,956,774 A | 9/1990 | Shibamiya et al. | |
| 5,265,244 A | 11/1993 | Ghosh et al. | |
| 5,542,089 A | 7/1996 | Lindsay et al. | |
| 5,630,120 A | 5/1997 | Vachey | |
| 5,675,786 A | 10/1997 | McKee et al. | |
| 5,689,696 A | 11/1997 | Gibbons et al. | |
| 5,692,171 A | 11/1997 | Andres | |
| 5,870,752 A | 2/1999 | Gibbons et al. | |
| 6,252,983 B1 | 6/2001 | Takeshima et al. | |
| 6,278,989 B1* | 8/2001 | Chaudhuri et al. | 1/1 |
| 6,438,552 B1 | 8/2002 | Tate | |
| 6,691,099 B1* | 2/2004 | Mozes | 1/1 |
| 6,732,085 B1* | 5/2004 | Mozes | 1/1 |
| 7,392,156 B2* | 6/2008 | Weber | 702/180 |
| 2003/0088542 A1* | 5/2003 | McGee et al. | 707/1 |
| 2007/0136317 A1* | 6/2007 | Przywara | 707/100 |
| 2008/0027687 A1* | 1/2008 | Aldridge | 703/2 |
| 2008/0120275 A1 | 5/2008 | Cruanes et al. | |

\* cited by examiner

*Primary Examiner* — Cheyne Ly
(74) *Attorney, Agent, or Firm* — Silicon Valley Patent Group LLP; Omkar Suryadevara

(57) ABSTRACT

A table-level histogram is maintained incrementally without requiring rescanning of the entire table when new data values are added to the table. A table has multiple partitions of data values. A histogram for data values of the partitions is generated. When a new partition of data values is added to the table, a histogram for only the new partition is generated. To generate a histogram for the entire table, the histograms for the previously generated and newly added partitions are used without needing to refer to the underlying data. A similar approach is applicable when modifying data values in a partition.

26 Claims, 5 Drawing Sheets

DETERMINING A HEIGHT-BALANCED HISTOGRAM INCREMENTALLY

CROSS-REFERENCE TO RELATED APPLICATION

This patent application claims the benefit of U.S. provisional patent application 61/057,677, filed May 30, 2008, which is incorporated by reference.

BACKGROUND OF THE INVENTION

This invention relates to the field of database and data analysis and more specifically, to a technique of incrementally determining a histogram for a table as new data values are added or some data values are modified.

Organizations and companies are continually gathering a great deal of information and data about their organization. Such data includes customer information, marketing information, financial numbers, engineering data, and much more. And this data is often stored in a database and these databases are continually being updated with new data as it is received.

Typically, organizations analyze the gathered data in order to determine how the organization is doing, efficiency, trends in the data, and many other statistics. An example of a statistic that is used to analyze data is the histogram. Histograms can be used for a cost-based optimizer to estimate selectivity of predicates seen in a query. As the amount of data becomes more voluminous, it generally takes more time to determine or derive statistics on the data.

Further, analyzing the data is a continual process and takes a great deal of computing time, since the analysis and statistics need to be updated with new data is received. Further, analysis may only be desired on a portion of the data, so that is can be compared against other portions of the data.

Therefore, there is a need for more efficient techniques of analyzing data and forming or deriving statistics on the data. This will reduce the amount of time needed to derive the statistics.

BRIEF SUMMARY OF THE INVENTION

A table-level histogram is maintained incrementally without requiring rescanning of the entire table when new data values are added to the table. A table has multiple partitions of data values. A histogram for data values of the partitions is generated. When a new partition of data values is added to the table, a histogram for only the new partition is generated. To generate a histogram for the entire table, the histograms for the previously generated and newly added partitions are used without needing to refer to the underlying data. A similar approach is applicable when modifying data values in a partition.

In an implementation, the invention is a method including: providing a table having a first set of values in a first partition and a second set of values in a second partition; providing a first histogram of the first set of values; providing a second histogram of the second set of values; and using the first and second histograms to generate a third histogram for the table.

The histograms may be height-balanced histograms or width-balanced histograms. The first set of values may have a different number of values from the second set of values. In some implementations, the first and second set can have same number of values.

In a technique of adding another partition with new values, the method includes: adding a third set of values in a third partition to the table; determining a fourth histogram for the third set of values; and using the first, second, and fourth histograms to generate a fifth histogram for the table.

In a technique of modifying values in a partition, the method includes: modifying at least one value of the first set of values; determining a fourth histogram for the first set of values with the modified at least one value; and using the second and fourth histograms to generate a fifth histogram for the table.

Further, the method can include: adding a third set of values in a third partition to the table; determining a sixth histogram for the third set of values; and using the second, fourth, and sixth histograms to generate a seventh histogram for the table.

When using the first and second histograms to generate the third histogram does not access the first and second partitions. The technique (or a system) does not need to scan the values to generate a histogram from these values. In other words, the technique does not access the values.

When using the first and second histograms to generate a third histogram for the table, the method includes: sorting values (e.g., either low to high or high to low) of the first and second histograms; storing sorted values of the first a second histograms in a list (or any other type of data structure); determining endpoints for the third histogram; and identifying values for endpoints for the third histogram by traversing through the sorted values in the list.

The histograms may be height-balanced histograms. The first histogram and second histogram can be stored in a data structure such as a table.

When determining endpoints for the third histogram comprises, the technique determines a total number of data values for the table. The first table and second table may have a different number of endpoints, or the number may be the same in other implementations.

In an implementation, the invention is a method including: providing a table including a first set of values in a first partition and a second set of values in a second partition; providing a first histogram of the first set of values stored in a memory; providing a second histogram of the second set of values stored in the memory; adding a third partition comprising a third set of values to the table; generating a third histogram for the third set of values; and combining values of the first, second, and third histograms and sorting the combined values.

The first, second, and third histograms may be height-balanced histograms. The first partition can include data values for a different time period from the data values of the second partition. The third histogram can be stored in the memory using any data structure. The method can include: identifying selected ones of the combined values as values for endpoints for a fourth histogram for the table.

Further the method can include: modifying at least one of the second set of values; generating a fourth histogram for the second set of values; removing the second histogram from the memory; and storing the fourth histogram in the memory.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
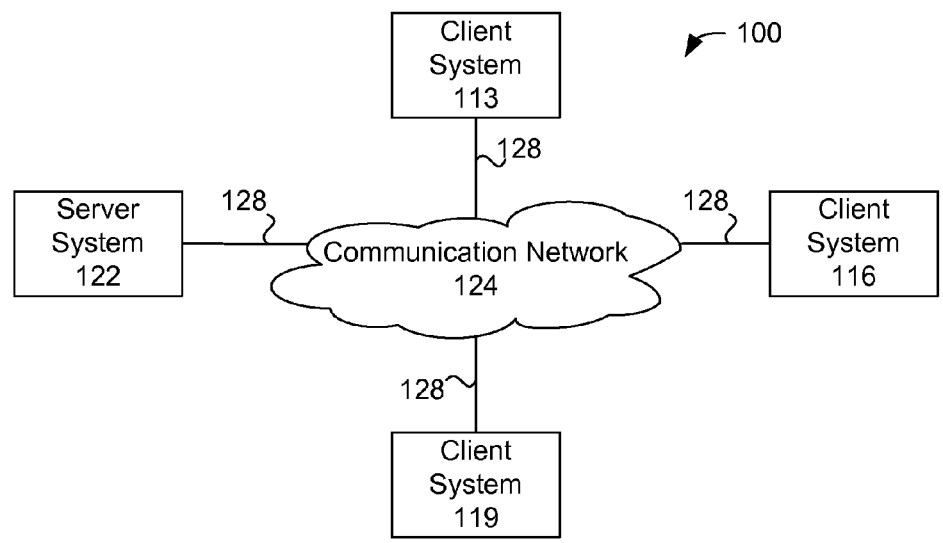
FIG. 1 shows a block diagram of a client-server system and network in which an embodiment of the invention may be implemented.

FIG. 1 is a simplified block diagram of a distributed computer network 100 which may include an implementation of the present invention. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, and the Firefox browser provided by Mozilla Foundation, and others.

Figure 2:
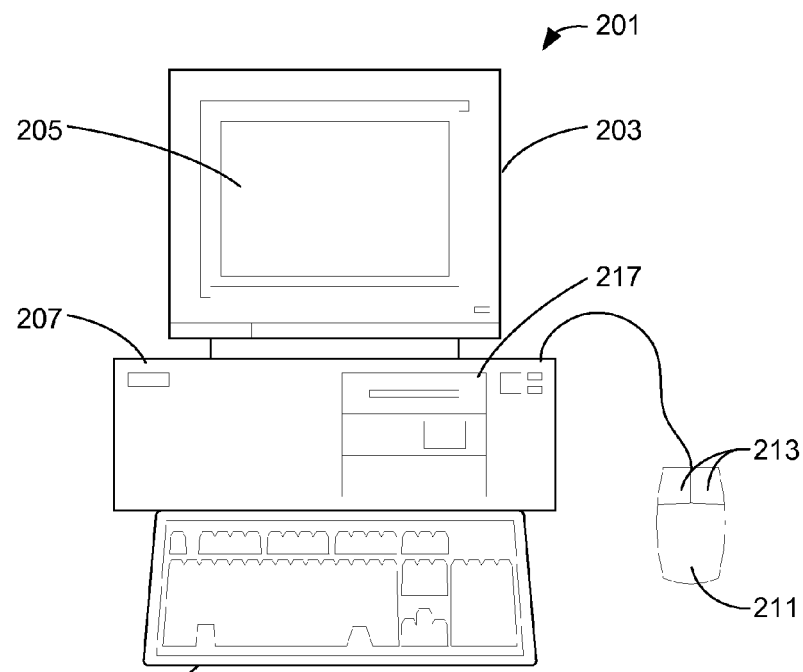
FIG. 2 shows a more detailed diagram of an exemplary client or computer which may be used in an implementation of the invention.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other non-volatile solid-state storage (e.g., USB flash drive), battery-backed-up volatile memory, tape storage, reader, and other similar media, and combinations of these.

A computer-implemented or computer-executable version of the invention may be embodied using, stored on, or associated with a non-transitory computer-readable medium. A non-transitory computer-readable medium may include any non-transitory medium that participates in providing instructions to one or more processors for execution. Such a non-transitory medium may take many forms including, but not limited to, nonvolatile, and volatile media. Nonvolatile media includes, for example, flash memory, or optical or magnetic disks. Volatile media includes static or dynamic memory, such as cache memory or RAM.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
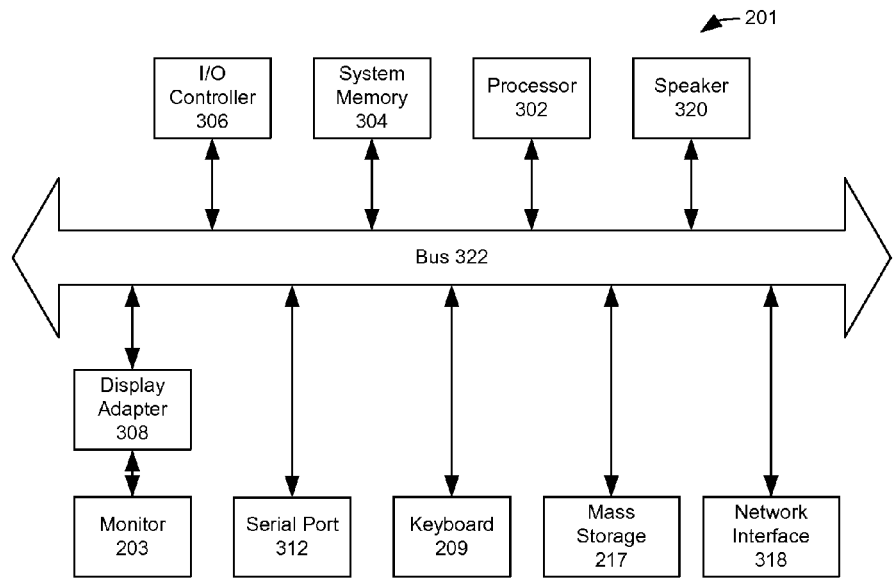
FIG. 3 shows a system block diagram of a client computer system used to provide a user interface according to the invention.

FIG. 3 shows a system block diagram of computer system 201 which may be used to execute software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
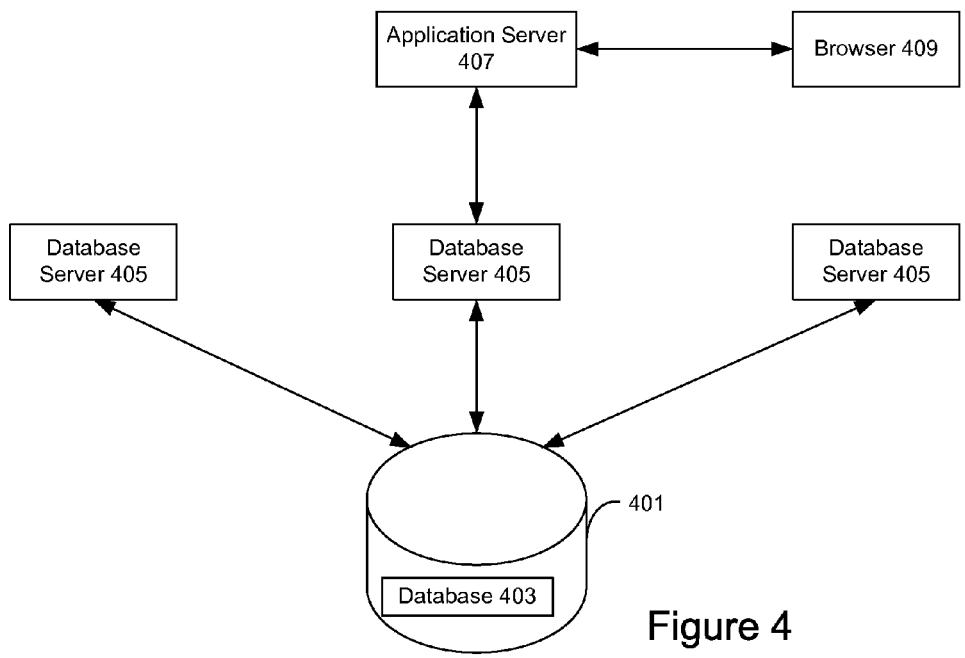
FIG. 4 shows data source or data service in the form of a database system.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

Figure 5:
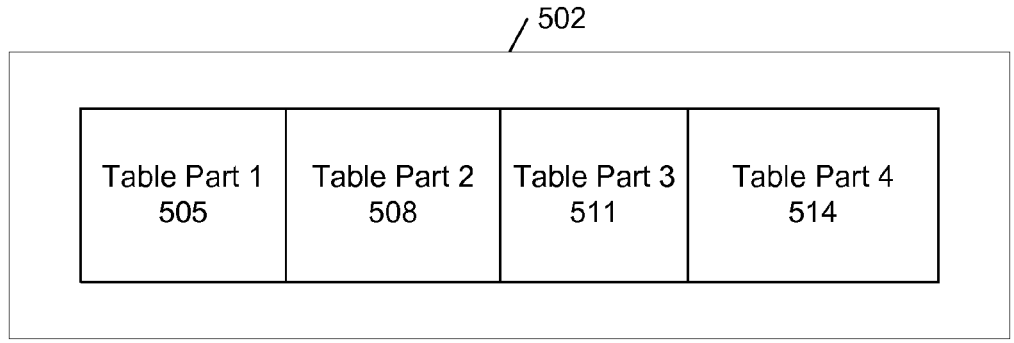
FIG. 5 shows a table of a database that has been partitioned into multiple parts.

FIG. 5 shows a table 502 of a database that has been partitioned into multiple parts. A database may have a single table or multiple tables. A table can hold or store any data desired by the user, such as a table of values.

Table 502 is partitioned in four parts: table part 1 (505), table part 2 (508), table part 3 (511), and table part 4 (514). The table can be partitioned into as many parts or partitions as desired: one, two, three, four, or more than four partitions. Each partition can be any size where some partitions have more data than others. A larger partition will take up more storage space than a smaller partition. Each partition can be a different size from other partitions.

There are many reasons for partitioning a table. Partitioning a table can help with maintenance of the database, such as facilitating backing up of a database incrementally by partition. When backing up the data, only partitions after a certain date will need to be archived because the older partitions were previously archived, and do not need to be archived again. Therefore, partitioning the database permits faster backing up of the database.

Partitioning of the data can be according to any desired scheme, such as partitioning according to some attribute of the data within the table. Partitioning can also be according to when data was loaded into the table. For example, an approach is to partition data by calendar quarter; each partition would hold three months of data.

Database partitioning improves the search efficiency of the database system in certain situations by avoiding the need to search an entire table. With database partitioning, an object, such as a database table, is divided up into subtables, referred to as "partitions." The particular partition in which a row or object is stored depends on values in one or more columns of the table. These columns are referred to herein as partition keys and the values contained in them are referred to as partition key values.

A form of partitioning is referred to as range partitioning. With range partitioning, each individual partition corresponds to a certain range of partition key values. For example, a partition key of a table may store date values that fall within a certain year, and the table may be divided into twelve partitions, each of which corresponds to a month of that year. Rows with a date value that fall within a certain month are stored in the partition that corresponds to that month.

Another form of partitioning is referred to as hash partitioning. In hash partitioning, one or more values in partition keys are applied to a hash function to produce a hash value. A separate partition is established for a hash function value produced by the hash function, and rows having a partition key value that evaluates to that hash function value are stored within the partition.

Another form of partitioning is referred to as list partitioning. An example of a list partition is to partition according to each state of a country.

The technique for aggregating histograms of the invention is applicable to histograms created from any of the partition types described in this application and other types as well.

Statistics are often kept pertaining to data stored in a database. In partitioned tables, statistics may be kept at both the partition level ("partition statistics") and the table level ("global statistics"). An example use for these statistics is a cost-based query optimizer; however, other uses exist. A cost-based optimizer chooses an optimum execution plan for an SQL statement based on statistics about the data accessed by the statement. It is therefore important for the quality of the execution plan that statistics accurately reflect the state of the database objects.

A technique creates a histogram table for an entire table, which is partitioned. The table contains a list of values, and a histogram provides a distribution of the values. Data that can be sorted can be showed as a histogram distribution.

There are various types of histograms. One type of histogram is a width-balanced histogram. These histograms look resemble vertical bar charges. For a width-balanced histogram, the height of a histogram bin will vary and generally be proportional on the number of values within a bin. For example, if a first bin has four values, a second bin that has eight values will be twice as tall.

Another type of histogram is a height-balanced histogram. Height-balanced histograms look more like number lines, in which the numbers marked are the endpoints of ranges for the values falling between the endpoints. Vertical bars could be shown on height-balanced histograms, but they would all be the same height.

Table A shows a first data set. Table B shows a width-balanced histogram for the first data set. Table C shows a height-balanced histogram for the second data set; values E1 to E10 can be referred to as endpoints.

TABLE A

| Item | Value | |
|------|-------|----|
| 1 | 1 | |
| 2 | 1 | |
| 3 | 2 | E1 |
| 4 | 2 | |
| 5 | 2 | |
| 6 | 3 | E2 |
| 7 | 3 | |
| 8 | 3 | |
| 9 | 3 | E3 |
| 10 | 3 | |
| 11 | 3 | |
| 12 | 4 | E4 |
| 13 | 5 | |
| 14 | 5 | |
| 15 | 6 | E5 |
| 16 | 6 | |
| 17 | 16 | |
| 18 | 17 | E6 |
| 19 | 18 | |
| 20 | 18 | |
| 21 | 18 | E7 |
| 22 | 18 | |
| 23 | 21 | |
| 24 | 22 | E8 |
| 25 | 57 | |
| 26 | 57 | |
| 27 | 66 | E9 |
| 28 | 67 | |
| 29 | 69 | |
| 30 | 100 | E10 |

TABLE B

| Number of Values (Height) | 16 | 6 | 2 | 0 | 0 | 2 | 3 | 0 | 0 | 1 |
|---|---|---|---|---|---|---|---|---|---|---|
| Bin | 1-10 | 11-20 | 21-30 | 31-40 | 41-50 | 51-60 | 61-70 | 71-80 | 81-90 | 91-100 |

TABLE C

| 2 | 3 | 3 | 4 | 6 | 17 | 18 | 22 | 66 | 100 |
|---|---|---|---|---|----|----|----|----|-----|
| E1 | E2 | E3 | E4 | E5 | E6 | E7 | E8 | E9 | E10 |

In an approach to creating a histogram table, partition-level histogram gathering and table-level histogram gathering are independent of each other. This means when data changes happen, not only does the system we need to gather histogram again on the changed partitions, but also the system needs to scan the entire table to get table level histogram. The approach is:

1. Take all values in the entire table, ignoring the partitioning of the data.
2. Sort the values. Table A shows 30 sorted values.
3. Create the histogram distribution of the values. Examples of histograms for the 30 values are in tables B and C. Whenever new data values are added to the table (or a new partition of data is added), the histogram is regenerated again.

Another approach is to create the histogram table incrementally, without needing to recalculate the histogram for previously considered values or partitions. This approach takes into consideration the partitioning the data and calculates a histogram for the recently added values or partition. This approach does not need to recalculate histograms for previously considered values or partitions. This approach uses less computing time to calculate the histogram for the entire table.

In a specific implementation of the invention, the system creates a height-balanced histogram with size m for a table which is partitioned. The technique derives a table-level histogram that is sufficiently accurate from the individual partition-level histograms. When data changes occur, the system gathers only the histograms of the changed partitions and then derives the table-level histogram without rescanning the entire table.

In other words, given H(P1), H(P2), H(P3) and H(P4), a technique of the invention determines H(T). H(P1) is a histogram of table partition 1. H(P2) is a histogram of table partition 2. H(P3) is a histogram of table partition 3. H(P4) is a histogram of table partition 4. H(T) is a histogram of the entire table, including values in all partitions 1 to 4.

Some specific flows for determining a histogram incrementally are presented below, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

Figure 6:
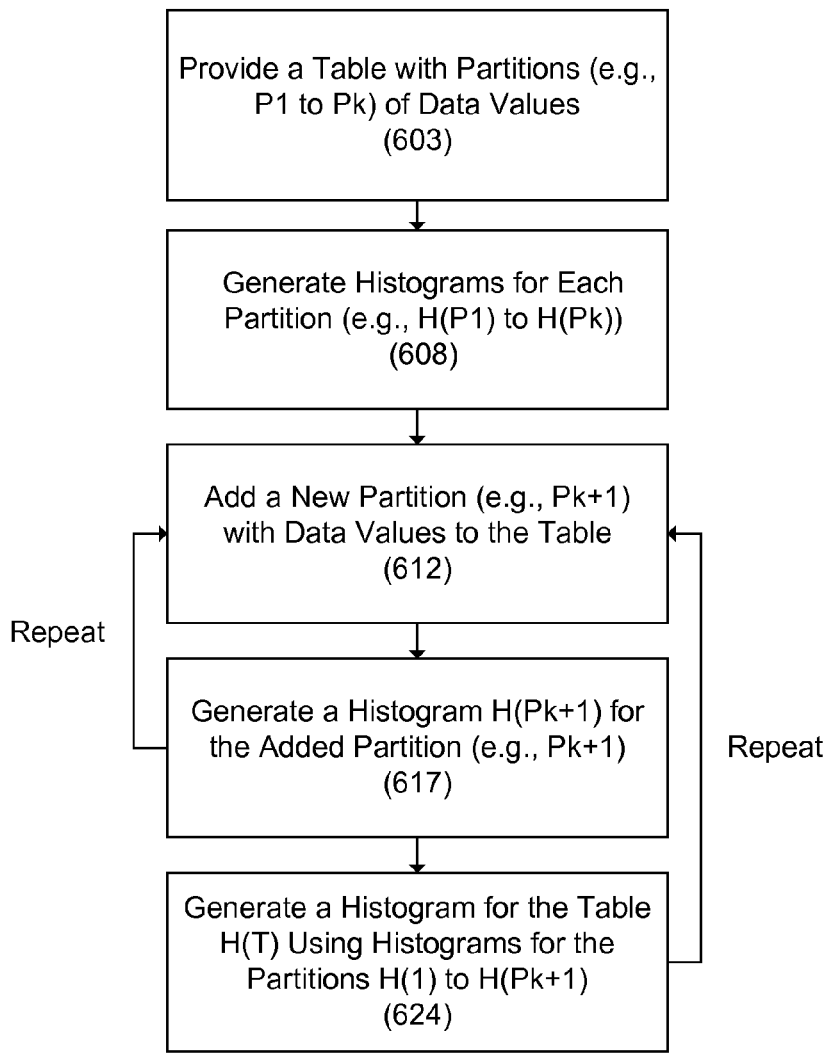
FIG. 6 shows a flow of determining a histogram for a table when adding a partition to the table.

FIG. 6 shows a flow of determining a histogram for a table when adding a partition to the table. In a step 603, a table with partitions (e.g., P1 to Pk) of data values is provided. For example, table 502 in FIG. 5 has four partitions, P1, P2, P3, and P4. As discussed above, depending on how the table is partitioned, the number of data values or rows for each of the partitions may be different from each number (or may be the same).

In a step 608, histograms for each partition (e.g., H(P1) to H(Pk)) are generated. In a specific implementation, the histograms are height-balanced histograms. For table 502, four histograms or histogram tables, H(P1), H(P2), H(P3), and H(P4), are generated.

In a step 612, a new partition (e.g., Pk+1) with data values is added to the table. For table 503, as an example, a partition P5 (not shown) is added.

In a step 617, a histogram H(Pk+1) for the added partition (e.g., Pk+1) is generated. For table 503, histogram H(P5) is generated.

In a step 624, generate a histogram for the table H(T) using histograms for the partitions H(1) to H(Pk+1). In a specific implementation, histogram H(T) is a height-balanced histogram. For table 503, the histogram from H(T) or H(P1+P2+P3+P4+P5) is generated by using only H(P1), H(P2), H(P3), H(P4), and H(P5). The underlying data values or rows in each of the partitions do not need to be referred to.

In an implementation, steps 612 and 617 are repeated as needed. For example, the system can repeatedly collect histograms for added partitions since the last statistics collection, and then finally generate the histogram for the table (step 624).

In an implementation, as new partitions are added, steps 612, 617, and 624 are repeated. For example, for table 503, after a partition P6 (not shown) is added, steps 617 and 624 are repeated.

Figure 7:
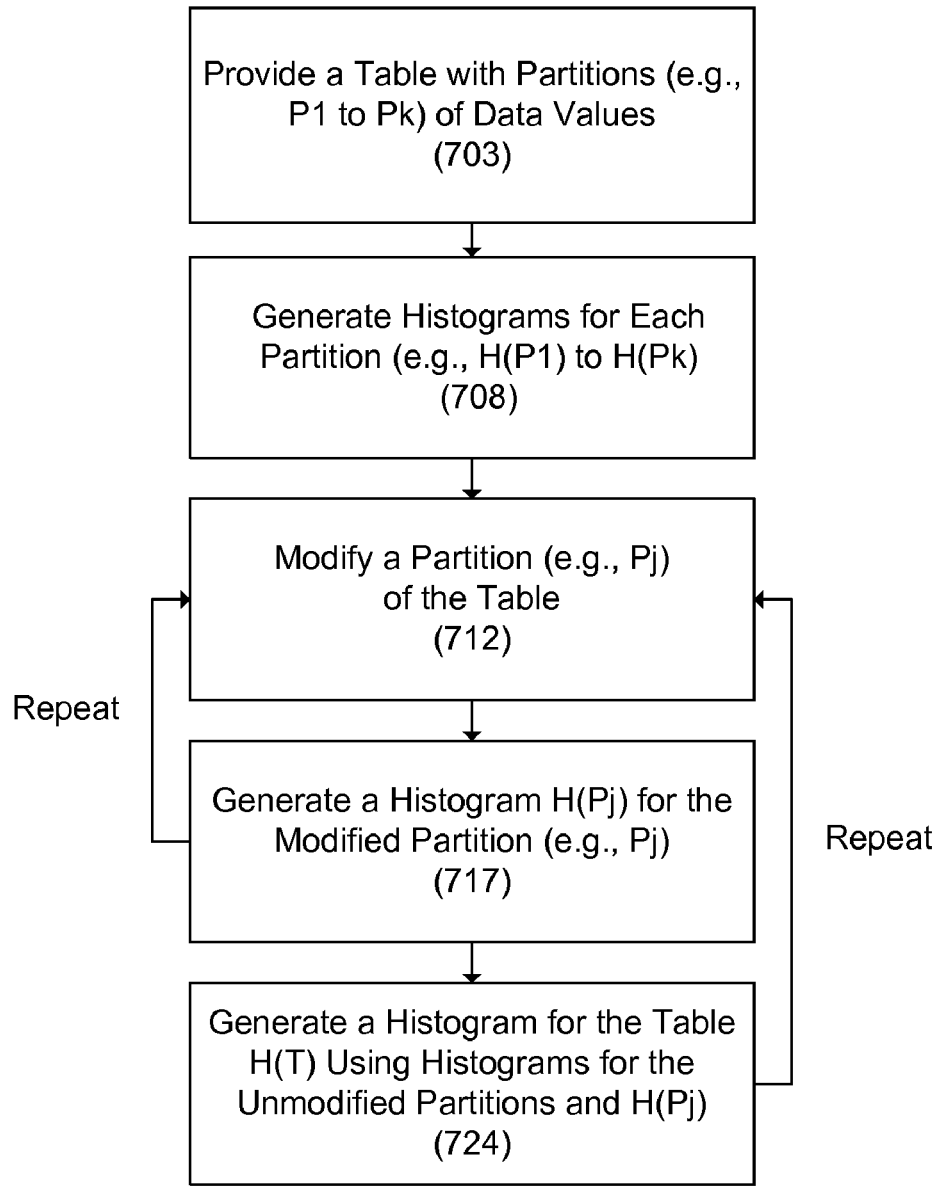
FIG. 7 shows a flow of determining a histogram for a table when modifying a partition to the table.

The technique of the invention is also applicable when modifying data in one or more partitions of a table. FIG. 7 shows a flow of determining a histogram for a table when modifying a partition to the table.

In a step 703, a table with partitions (e.g., P1 to Pk) of data values is provided. For example, table 502 in FIG. 5 has four partitions, P1, P2, P3, and P4. As discussed above, depending on how the table is partitioned, the number of data values or rows for each of the partitions may be different from each number (or may be the same).

In a step 708, histograms for each partition (e.g., H(P1) to H(Pk)) are generated. In a specific implementation, the histograms are height-balanced histograms. For table 502, four histograms or histogram tables, H(P1), H(P2), H(P3), and H(P4), are generated.

In a step 712, a partition (e.g., Pj) is modified. For table 503, as an example, partition P3 is modified.

In a step 717, a histogram H(Pj) for the modified partition (e.g., Pj) is generated. For table 503, a new histogram H(P3) is generated. The previously generated histogram for H(P3) is discarded.

In a step 724, generate a histogram for the table H(T) using histograms for the unmodified partitions and the newly generated histogram for the modified partition H(Pj). In a specific implementation, histogram H(T) is a height-balanced histogram. For table 503, the histogram from H(T) or H(P1+P2+P3+P4) is generated by using only H(P1), H(P2), new H(P3), and H(P4). The underlying data values or rows in each of the partitions do not need to be referred to.

In an implementation, steps 712 and 717 repeated as needed. For example, the system can repeatedly collect histograms for modified partitions since the last statistics collection, and then finally generate the histogram for the table (step 624).

In an implementation, when partitions are modified, steps 712, 717, and 724 are repeated. For example, for table 503, when partition P1 is modified, steps 717 and 724 are repeated.

In a specific implementation, a method of the invention includes:

1. A table T has partitions P1 . . . Pk, where k is an integer.

2. For each partition, there is an estimated height-balanced histogram and an estimate of the total number of rows in the partition. The system can logically put the data in two tables: one for the row count and one for the histograms.

3. Table ROWCOUNT has columns:

(a) PID: Partition ID; and (b) CNT: Total number of rows in the partition.

4. Table HIST has columns:

(a) PID: Partition ID;

(b) VALUE: Data value that appears as a boundary in the partition's histogram; and (c) CNT: How many times this value appears as a boundary. This could be more than one for very common values in the partition.

The value m is the supported histogram size (e.g., 254) or number of buckets. As an example, for table C, m is ten. Then for each distinct PID the sum of CNT for that PID from the HIST table would be exactly m. The value N is the total number of rows (or data values) of the table.

Table D provides a first pseudocode example for a technique for creating histogram at table level.

TABLE D

```
Get the table size
N = SELECT sum(CNT) FROM ROWCOUNT
Get each bucket, its size, and then sort the values
Open cursor C as
SELECT H.VALUE, H.CNT * (P.CNT/m) as PART_BUC_SIZE
FROM HIST H, ROWCOUNT P
WHERE H.PID = P.PID
ORDER BY H.VALUE
Initialize
Processed_bucket_size =0;
loop   fetch next row from C
   Processed_bucket_size = Processed_bucket_size + C.PART_BUC_SIZE
   if (Processed_bucket_size >= N/m)
      ### we are done with the bucket
      Output C.VALUE as an endpoint value for the table
      Processed_bucket_size = 0;
   end if
end loop when no more rows in C
```

Table E provides a second pseudocode example for a technique for creating histogram at table level.

TABLE E

```
Get the number of buckets needed for the table's histogram into m. Get
the number of rows of the table into N. Get each bucket value, and its size
for all the partitions into cursor C. Sort the bucket values in C.
Processed_bucket_size = 0;
for each row from C
    Processed_bucket_size = Processed_bucket_size + C.SIZE
    if (Processed_bucket_size >= N/m)
        Output C.VALUE as an endpoint value for the table's histogram
        Processed_bucket_size = 0;
    end if
end for
```

Figure 8:
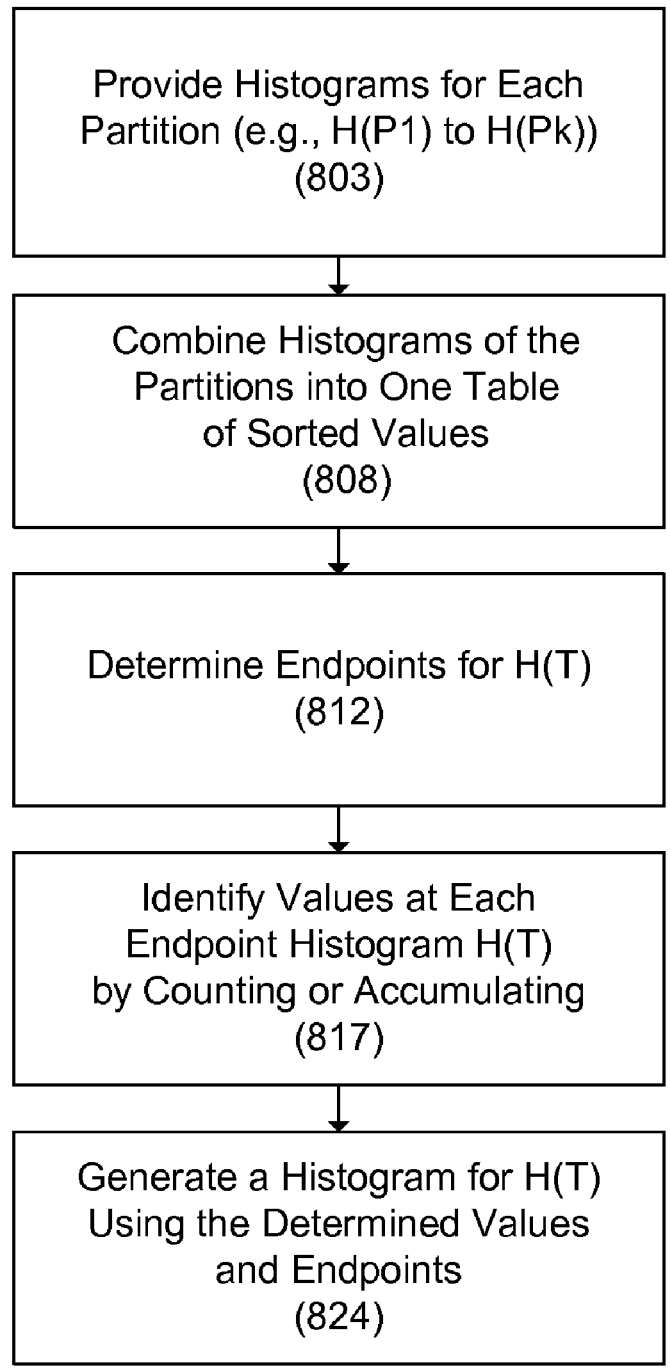
FIG. 8 shows a flow for determining a histogram for a table where histograms for partitions of the table are known.

FIG. 8 shows a flow for a technique of determining a histogram for a table where histograms for partitions of the table are already known. This flow may be used in combination with the other flows discussed above.

In a step 803, histograms for each partition (e.g., H(P1) to H(Pk)) are provided. In a specific implementation, the histograms are height-balanced histograms. Each histogram may have the same or different number of endpoints.

In a step 808, values of the histograms of the partitions are combined into a table of sorted endpoint values.

In a step 812, endpoints for the histogram for the entire table, H(T), are determined.

In a step 817, values at each of the endpoints for histogram H(T) are identified by counting (or accumulating) through the table of sorted endpoint values. In a specific implementation, the endpoint values are determined in such a way that the number of rows between the previous endpoint and the current endpoint is N/m.

In a step 824, the histogram H(T) is determined using the determined values and endpoints.

As an example, the following provides an example of applying a flow of FIG. 8 to some data values. Table A above provides a first set of data, and table C provides a height-balanced histogram for the first set of data. Table F below shows a second data set, and table G shows a height-balanced histogram for the second data set.

TABLE F

| Item | Value |    |
|------|-------|----|
| 1    | 1     |    |
| 2    | 1     |    |
| 3    | 2     | E1 |
| 4    | 5     |    |
| 5    | 5     |    |
| 6    | 6     | E2 |
| 7    | 8     |    |
| 8    | 8     |    |
| 9    | 9     | E3 |
| 10   | 10    |    |
| 11   | 10    |    |
| 12   | 11    | E4 |
| 13   | 12    |    |
| 14   | 14    |    |
| 15   | 14    | E5 |
| 16   | 15    |    |
| 17   | 16    |    |
| 18   | 16    | E6 |
| 19   | 19    |    |
| 20   | 19    |    |
| 21   | 20    | E7 |
| 22   | 21    |    |
| 23   | 22    |    |
| 24   | 22    | E8 |
| 25   | 28    |    |
| 26   | 28    |    |
| 27   | 31    | E9 |
| 28   | 43    |    |
| 29   | 99    |    |
| 30   | 99    | E10|

TABLE G

| 2  | 6  | 9  | 11 | 14 | 16 | 20 | 22 | 31 | 99  |
|----|----|----|----|----|----|----|----|----|-----|
| E1 | E2 | E3 | E4 | E5 | E6 | E7 | E8 | E9 | E10 |

For this example of an application of the technique of the invention, tables A and F represent two different partitions of a table of data. Table A is the first partition, and table F is the second partition. The entire table, both tables A and F together, has a total of sixty (i.e., N) values. Each partition, table A and F individually, has thirty values. Each of the histogram tables, tables C and G, has ten (i.e., m) bins or buckets.

The technique takes tables C (i.e., H(P1)) and G (i.e., H(P2)) and creates a histogram table, H(T), with m bins (i.e., 10) including representing all data values (or rows) for both partitions:

1. Determine the total number of values. The total number of values (N) is given by a sum of the data values in each table (i.e., 30+30=60). Each table may have a different number of values from each other.

2. Determine the number of bins. The number of bins is m (i.e., 10). The number of bins may be any desired value. And the number of bins may be same, or different, from the number of bins used for each partition.

3. Determine the size of a bin. The size of a bin will be N/m (i.e., 60/10=6).

4. Combine tables C and G together and sort according to the endpoint values. Table H is a combined table including sorted values from both tables C and G.

TABLE H

| 2  | 2*  | 3  | 3*  | 4  | 6*  | 6  | 9*  | 11 | 14*  |
|----|-----|----|-----|----|-----|----|-----|----|------|
| 16 | 17* | 18 | 20* | 22 | 22* | 31 | 66* | 99 | 100* |

5. The number of items each bin in H(P1) and H(P2) represents is known (i.e., 3 items each). Therefore, each box in table H represents 3 items. However, each box in H may represent a different number of items, depending on the number items each endpoint represents in the histograms of the underlying partitions.

6. To determine an endpoint for each bin of H(T), count or accumulate N/m values (i.e., 6) in table H. Since each box in table H represents 3 items, for H(T), every other box will be the sixth value. The endpoint in every other box will be the endpoint for H(T). Values in table H that are the endpoints for H(T) are marked with an asterisk.

Table I provides H(T), the height-balanced histogram for a table with values in partitions given by table C and G.

TABLE I

| 2  | 3  | 6  | 9  | 14 | 17 | 20 | 22 | 66 | 100 |
|----|----|----|----|----|----|----|----|----|-----|
| E1 | E2 | E3 | E4 | E5 | E6 | E7 | E8 | E9 | E10 |

The above example provides merely a demonstration the principles of the invention and one of skill in the art would recognize that the invention can be extended and adapted as needed for a specific application and circumstance. The approach may be applied to a table having any number partitions (e.g., two, three, four, five, six, seven, eight, or more partitions). Each partition can have any number of data values or rows. Each partition can have a different number of data values from other partitions.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A computer-implemented method comprising:
   providing in a computer, a table in a database which uses tables to store information, the table comprising a first plurality of rows in a first partition and a second plurality of rows in a second partition;
   providing in the computer, a first partition-level height-balanced histogram of the first plurality of rows in the first partition of the table;
   providing in the computer, a second partition-level height-balanced histogram of the second plurality of rows in the second partition of the table; and
   combining in the computer, at least the first and second partition-level height-balanced histograms to generate and store in a memory of the computer, a third table-level height-balanced histogram for the table;
   wherein the third table-level height-balanced histogram comprises multiple buckets; and
   wherein a first count of rows, in a bucket among the multiple buckets in the third table-level height-balanced histogram, is determined by use of at least N/m, N being total number of rows in the table and m being a second count of the multiple buckets in the third table-level height-balanced histogram.

2. The method of claim 1 wherein the first plurality comprises a different number of rows from the second plurality.

3. The method of claim 1 comprising:
   adding a third plurality of rows in a third partition to the table;
   determining a fourth histogram for the third plurality of rows; and
   using the first, second, and fourth histograms to generate a fifth histogram for the table.

4. The method of claim 1 comprising:
   modifying at least one row of the first plurality of rows;
   determining a fourth histogram for the first plurality of rows with the modified at least one row; and
   using the second and fourth histograms to generate a fifth histogram for the table.

5. The method of claim 4 comprising:
   adding a third plurality of rows in a third partition to the table;
   determining a sixth histogram for the third plurality of rows; and
   using the second, fourth, and sixth histograms to generate a seventh histogram for the table.

6. The method of claim 1 wherein the combining to generate the third histogram for the table comprises:
   sorting values in one or more columns of the first and second histograms;
   storing sorted values of the first a second histograms obtained by said sorting, in a list; and
   determining endpoints for buckets in the third histogram at least by traversing through the sorted values in the list.

7. The method of claim 1 wherein the first histogram and second histogram are stored in another table.

8. The method of claim 6 wherein the determining endpoints further comprises determining a total number of values in the list.

9. The method of claim 6 wherein the first table and second table have a different number of endpoints.

10. The method of claim 6 wherein the first, second, and third histograms have a common number of endpoints.

11. A non-transitory computer readable storage medium comprising instructions for a computer to perform a method, the instructions comprising:
    instructions to provide in said computer, a table in a database which uses tables to store information, said table comprising a first plurality of rows in a first partition and a second plurality of rows in a second partition;
    instructions to provide in said computer, a first height-balanced histogram of the first plurality of rows in the first partition of said table;
    instructions to provide in said computer, a second height-balanced histogram of the second plurality of rows in the second partition of said table;
    instructions to said computer to combine at least the first and second partition-level height-balanced histograms to generate and store in a memory of said computer a third height-balanced histogram for the table;
    wherein the third table-level height-balanced histogram comprises multiple buckets; and
    wherein a first count of rows, in a bucket among the multiple buckets in the third table-level height-balanced histogram, is determined by use of at least N/m, N being total number of rows in the table and m being a second count of the multiple buckets in the third table-level height-balanced histogram.

12. The non-transitory computer readable storage medium of claim 11 further comprising:
    instructions to store the third height-balanced histogram in the memory.

13. The non-transitory computer readable storage medium of claim 11 further comprising:
    instructions to modify at least one of the second plurality of rows;
    instructions to generate a fourth height-balanced histogram for the second plurality of rows;
    instructions to remove the second height-balanced histogram from the memory; and
    instructions to store the fourth height-balanced histogram in the memory.

14. The non-transitory computer readable storage medium of claim 11 wherein the first partition comprises data values for a different time period from data values of the second partition.

15. The method of claim 1 further comprising:
    said computer using at least one of the histograms in an optimizer of a relational database management system to choose an execution plan for an SQL statement.

16. A computer comprising a processor and a memory, the memory comprising a plurality of instructions, the plurality of instructions comprising:
    instructions to provide in said computer, a table in a database which uses tables to store information, said table being partitioned to comprise a first plurality of rows in a first partition and a second plurality of rows in a second partition;
    instructions to provide in said computer, a first partition-level height-balanced histogram of the first plurality of rows;

instructions to provide in said computer, a second partition-level height-balanced histogram of the second plurality of rows; and instructions to combine in said computer, at least the first and second partition-level height-balanced histograms to generate and store in a memory of said computer, a third table-level height-balanced histogram for the table;

wherein the third table-level height-balanced histogram comprises multiple buckets; and wherein a first count of rows, in a bucket among the multiple buckets in the third table-level height-balanced histogram, is determined by use of at least N/m, N being total number of rows in the table and m being a second count of the multiple buckets in the third table-level height-balanced histogram.

17. The non-transitory computer readable medium of claim 11 further comprising:

instructions to use at least one of the histograms in an optimizer of a relational database management system to choose an execution plan for an SQL statement.

18. The non-transitory computer readable medium of claim 11 further comprising:

instructions to sort values in one or more columns of the first and second histograms;

instructions to store in a list, sorted values of the first a second histograms obtained by execution of said instructions to sort; and instructions to determine endpoints for buckets in the third histogram at least by traversing through the sorted values in the list.

19. The non-transitory computer readable medium of claim 18 wherein:

the instructions to determine endpoints comprise instructions to determine a total number of values in the list.

20. The computer of claim 16 further comprising:

instructions to use at least one of the histograms in an optimizer of a relational database management system to choose an execution plan for an SQL statement.

21. The method of claim 1 wherein:

the third table-level height-balanced histogram is generated by combining at least the first and second partition-level height-balanced histograms, without rescanning the table.

22. The non-transitory computer readable medium of claim 11 wherein:

the third table-level height-balanced histogram is generated by execution of the instructions to combine at least the first and second partition-level height-balanced histograms, without rescanning the table.

23. The computer of claim 16 wherein:

the third table-level height-balanced histogram is generated by operation of the means for combining at least the first and second partition-level height-balanced histograms, without rescanning the table.

24. The method of claim 1 wherein:

the third table-level height-balanced histogram is generated by combining at least the first and second partition-level height-balanced histograms without referring to underlying data in the table.

25. The non-transitory computer readable medium of claim 11 wherein:

the third table-level height-balanced histogram is generated by execution of the instructions to combine at least the first and second partition-level height-balanced histograms without referring to underlying data in the table.

26. The computer of claim 16 wherein:

the third table-level height-balanced histogram is generated by operation of the means for combining at least the first and second partition-level height-balanced histograms without referring to underlying data in the table.

* * * * *